Feb. 18, 1958

A. E. DELAPORTE 2,824,272

ROTARY ELECTRIC MACHINE

Filed Jan. 9, 1956

INVENTOR
ARISTIDE EUGENE DELAPORTE
BY Young Emery & Thompson
ATTYS.

INVENTOR
ARISTIDE EUGENE DELAPORTE
BY Young, Emery & Thompson
ATTYS

Feb. 18, 1958 A. E. DELAPORTE 2,824,272
ROTARY ELECTRIC MACHINE
Filed Jan. 9, 1956 5 Sheets-Sheet 5

INVENTOR
ARISTIDE EUGENE DELAPORTE

United States Patent Office 2,824,272
Patented Feb. 18, 1958

2,824,272

ROTARY ELECTRIC MACHINE

Aristide Eugene Delaporte, Paris, France

Application January 9, 1956, Serial No. 558,098

5 Claims. (Cl. 318—197)

The present invention relates to a rotary electric machine of the motor type, of a special construction and capable of being combined in various manners with other electric machines for allowing a great variety of uses, either as a low speed positioning motor or as a high speed motor.

In accordance with the invention, the rotary machine, consisting of a rotor and a stator, is chiefly characterized in that one of said elements comprises an assembly of armatures regularly spaced, made out of a metal having a magnetic permeability, each armature comprising two pole pieces perpendicular to the axis of the machine, and a yoke, parallel to said axis, and carrying at least one field winding capable of creating polarities of opposed signs on the above mentioned pole pieces, the other element of the machine comprising axial armatures capable of closing the magnetic circuit of the armatures of the first element of the machine.

Preferably, the armatures of one, at least, of the elements of the machine carry a field winding around each pole piece. The armatures thus constituted may belong either to the rotor or to the stator of the machine, but, in a convenient embodiment they are arranged both on the rotor and on the stator, the rotor windings being energized through rings. The arrangement of the assembly is such that the radial pole pieces are in register and thus constitute two crowns on the rotor, and two others on the stator, the polarity being the same for all the pole pieces in one crown and these polarities being opposed on two crowns facing each other.

In the description which is about to follow, other features will be made apparent relating to the invention, and chiefly in connection with the combination of a machine of the above type with an electromagnetic switch for constituting a positioning motor or a high speed motor.

In the appended drawings, given by way of nonlimitative examples:

Figure 1:
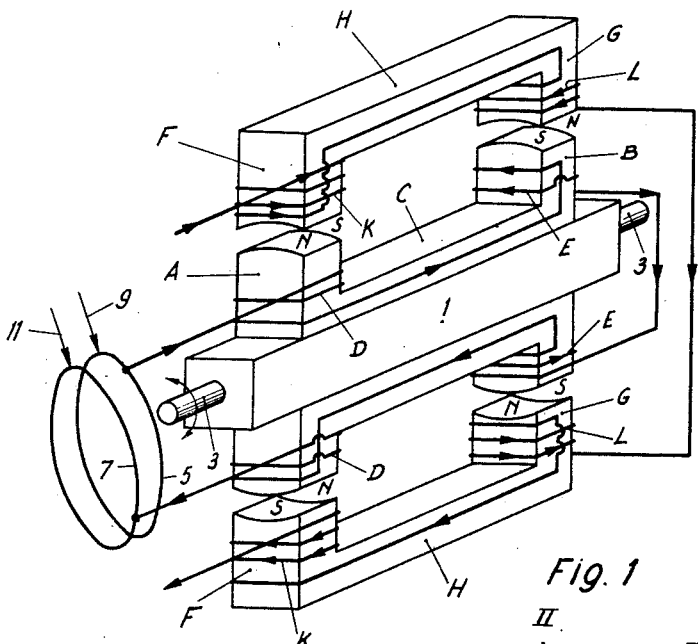
Figure 1 is a diagrammatic view, in perspective, illustrating the constitution of a machine according to the invention.

In the embodiment of Figure 1, the machine according to the invention comprises a rotor consisting of a core of non magnetic material 1 mounted on a shaft 3. This core carries a succession of armatures made of a magnetic material diametrically opposed one to another and distributed regularly about the shaft 3. Each armature comprises two radial pole pieces A and B connected through an axial yoke C.

Around these pole pieces, field windings D, E are arranged, and are mounted in series. In the example described, the windings D, E of one armature and of two diametrically opposed armatures are mounted in series.

The directions of the windings are such that for a given circulation of the power supply current, the pole pieces A all have the same polarity (north, for instance) and the pole pieces B, the opposite polarity (south). The power supply for the rotor is obtained by means of two rings 5 and 7 in contact with brushes 9 and 11 connected with suitable current source.

The stator of the machine, similarly, comprises an even number of magnetic armatures which have a similar constitution to that of the rotor armatures; radial pole pieces F and G connected by a longitudinal yoke H.

The number of stator armatures may have any value and may be different from that of the rotor armatures. The same holds for the dimensions of the pole pieces F and G. The radial pole pieces of the rotor, like those of the stator thus constitute two crowns located in planes perpendicular to the shaft 3. In Figure 1, for sake of clearness, two stator armatures only diametrically opposed have been represented which carry inducing windings K and L mounted in series and wound so as to cause on the pieces F and G poles having signs opposed to those of the rotor facing them (for instance south at F and north at G).

Owing to the arrangement provided in a plane perpendicular to the shaft 1, the rotor pole pieces will thus be of the same sign, all of them, and the stator pole pieces will be of opposed signs, to the extent in which they are energized and when the current flows in the suitable direction.

In an embodiment of the invention (Figure 2) four rotor armatures have been provided the pole pieces of which are shown $A_1$, $A_2$, $A_3$, $A_4$, the corresponding windings $D_1 \ldots D_4$ being energized in parallel from the ring 5.

The stator comprises, twelve armatures, the pole pieces of which are shown, $F_1$, $F_2 \ldots F_{12}$ and also the windings $K_1$, $K_2 \ldots K_{12}$. The various windings K and L for one armature being mounted in series as in Figure 1, may, for the various armatures, be associated in phase, three in number, for instance, thus giving the following distribution:

Phase I: windings $K_1$, $L_1$; $K_4$, $L_4$; $K_7$, $L_7$; $K_{10}$, $L_{10}$.
Phase II: windings $K_2$, $L_2$; $K_5$, $L_5$; $K_8$, $L_8$; $K_{11}$, $L_{11}$, etc.

The pole pitch of the rotor is twice that of the stator.

Figure 2:
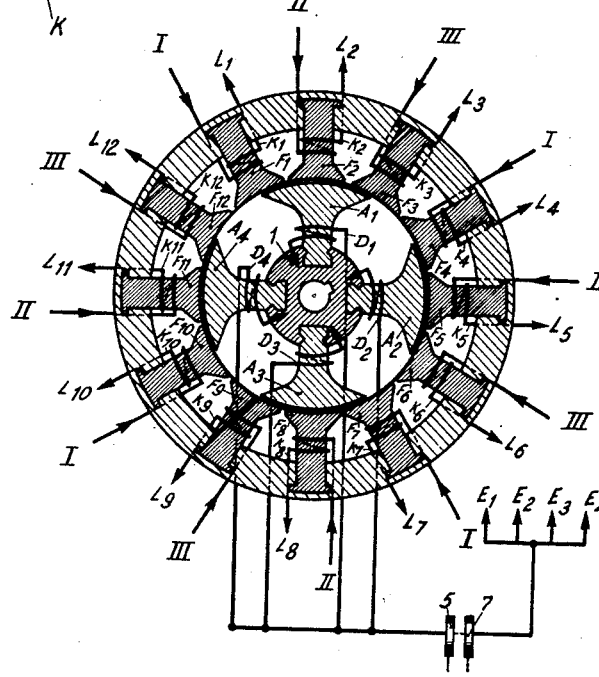
Figure 2 shows, diagrammatically, in cross section through a plane going through the poles of the rotor, a three-phase machine.

An arrangements similar to that of Figure 2 is adopted for the second crown of the machine, arranged in accordance with Figure 1 and comprising the pole pieces $G_1$, $G_2 \ldots G_{12}$ on the stator and $B_1$, $B_2 \ldots B_4$ on the rotor.

The machine thus constituted, according to the modes of power supply of the stator and rotor windings may operate either as a positioning motor intended particularly for remote control, or as a low speed motor or finally as a high speed motor.

If it is assumed that the rotor windings are energized with direct current from the rings 5 and 7, the rotor armatures behave like permanent magnets.

If now the stator windings are energized differently for each phase: for instance if the magnetizing current is the same in phases I and III, and if it is larger in phase II, then the pull exerted by the pole pieces $F_2$, $G_2$; $F_5$, $G_5$ . . . etc. . . . on the pole pieces $A_1$, $B_1$; $A_2$, $B_2$ . . . etc. . . . is larger than that exerted on these same pieces by $F_1$, $L_1$ or $F_3$, $L_3$.

Consequently, the rotor is subjected to a torque which rotates it and brings it to the position in which the flux circulation is maximum (position of Figure 2). It will be noted that this circulation takes place in planes parallel with the axis 3 and for each stator armature independently of the other armatures.

The various armatures facing the machine thus attracting one another like electro-magnets, the result is that the positioning forces may be made very high.

If the current distribution in the various phases of the stator windings is modified, the rotor moves in consequence.

If the variation thus caused between the phases is periodical, the rotor rotates and its speed may be controlled at will from zero up by controlling the supply frequency.

By interrupting the current variations in the stator phases, the rotor is locked. By reversing the direction of rotation a reversed operation is obtained. By increasing the current in the stator windings, the coupling is increased.

The machine, therefore, is capable of a large number of applications.

If the variation of the magnetic fluxes is slow (rotation up to 200 revolutions per minute), the armatures are preferably made of solid magnetic metal obtained by casting.

Above this frequency, the armatures should be laminated.

Obviously, within the scope of the invention, it is possible to reverse the parts played by the rotor and the stator. Similarly, in an embodiment with a stator control field, the rotor may be constituted by permanent magnets or even, in the case of machines with a low power rating, simply by axial soft iron bars or the like. Of course the widths of the yokes may be cut down to the dimensions allowed by the field windings, in order to obtain a machine with short magnetic circuits.

Figure 3:
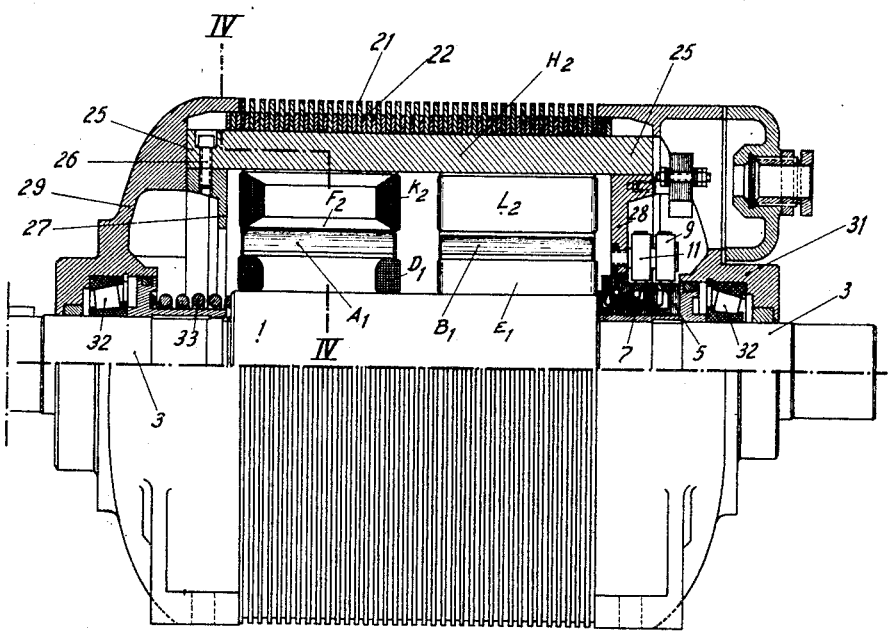
Figure 3 shows, in elevation, with an axial half section, a particular embodiment of a machine according to the invention.
Figure 4:
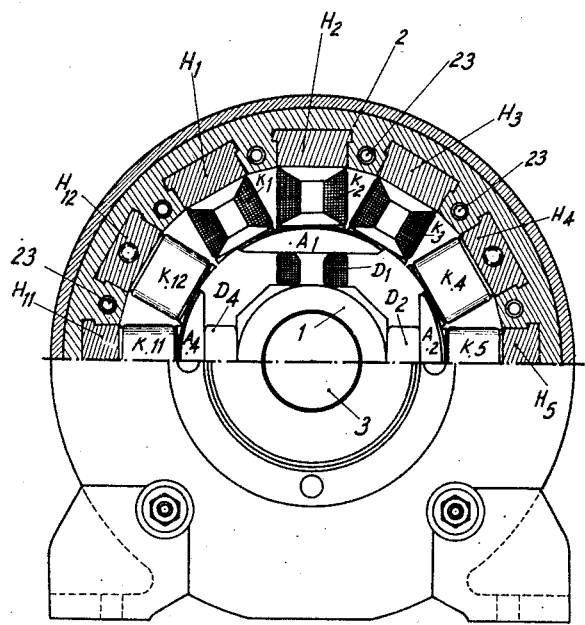
Figure 4 is a half section along IV—IV in Figure 3.

Figures 3 and 4 represent the construction of a machine corresponding to the diagram in Figure 2 and comprising similarly four pairs of rotor poles and twelve pairs of stator poles.

In this machine, the stator yoke 2 is constituted by a stack bolted along 23, of non magnetic metal plates 21, 22 (of Duralumin for instance) shaped as fins on the outside and, inside, offering notches into which the magnetic armatures H, for instance made of cast metal, have been forced.

The yokes H are slightly extended beyond the pole pieces F and G at 25, which makes it possible to secure them by two bolts 26 on two webs 27 and 28 (Figure 3). The machine also comprises two terminal flanges 29, 31, which contain conical bearings 32 forming stops for the rotor, which is held in position by spring 33. Spring 33 exerts a pressure on the conical bearings 32 thus strongly resisting any axial translation of the rotor during operation. The airgap is as short as possible.

Such a machine is intended chiefly for constituting a low speed motor. For that purpose it is associated electrically with a control machine, the assembly constituting a servo-mechanism, designed, in particular for remote control. The driving member, preferably, consists of an electro-magnetic switch (Figure 5) comprising, in the example described, a rotary field core 35 and a stator armature 36.

The core 35 carries four pole pieces $N_1$ . . . $N_4$ provided with windings $P_1$ . . . $P_4$ all wound in the same direction, and power supplied in series from the rings 37 by single phase alternating current. On the shaft 38 of the core 35 a reduction element 39 is mounted, which is driven by a micro-motor 41 which is used for controlling the angular position of the core 35.

Figure 5:
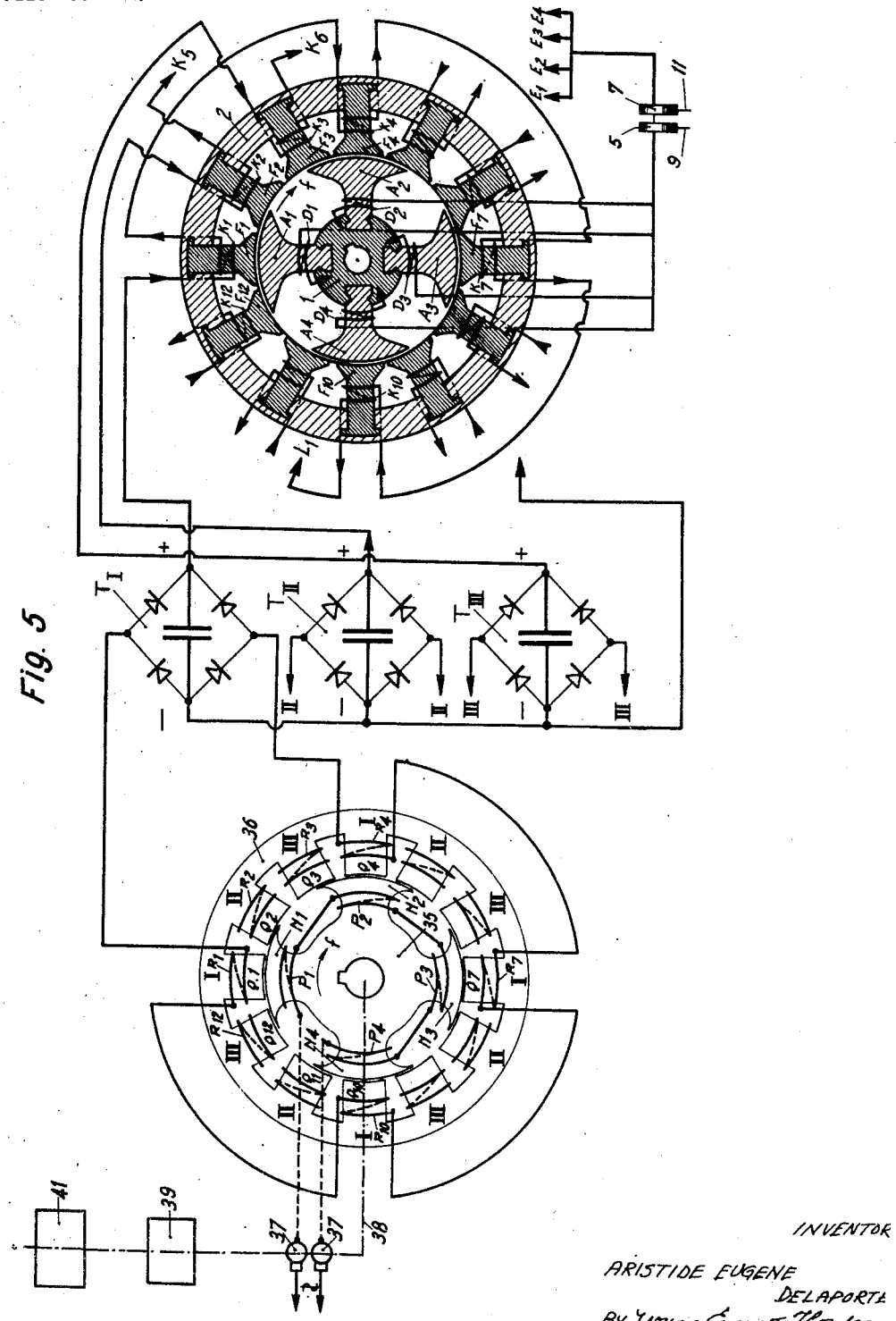
Figure 5 is a diagram showing an embodiment constituting a low speed motor for remote control.

The stator comprises twelve cores $Q_1$ . . . $Q_{12}$ carrying armature windings $R_1$ . . . $R_{12}$ distributed in three phases I, II, III. In Figure 5, only the connections of phase I have been represented (windings $R_1$, $R_4$, $R_7$, $R_{10}$ in series). Each phase feeds a rectifier bridge $T_I$, $T_{II}$, $T_{III}$, which rectifiers energize the stator windings K, L of a machine of the above mentioned type, with this difference however, with respect to Figure 2, that the windings of one phase (for instance $K_1$, $K_4$, $K_7$, $K_{10}$) are now mounted in series on the same crown.

The operation of the system is as follows:

The rotors 1 and 35 being in the position of Figure 5, the windings N send into the phase I of the windings R of the electro-magnetic switch a flux which is substantially twice that received by phases II and III.

The result is that the voltage delivered by the bridge $T_I$ is higher than the voltages delivered by bridges $T_{II}$ and $T_{III}$. Consequently, the field supplied by the windings $K_1$, $K_4$, $K_7$, $K_{10}$ of phase I of the machine is also higher.

The pole pieces A of the rotor 1 are than held by magnetic attraction forces in the position of Figure 5 in which the axes of these pole pieces A and of the pole pieces F coincide. The amplitudes of the attraction forces involved may be increased at will by acting on the current feeding the windings D and E.

If now the motor 41 is started, the core 35 rotates, for instance in the direction f. Then the flux increases in phase II and decreases in phases I and III. Consequently the rotor I rotates under the action of the magnetic attraction in the same direction f and by an equal angular amount.

If the rotor 35 rotates in a continuous manner, the rotor 1 does the same. The speed, therefore, can be adjusted finally from the micro-motor 41.

Among the advantages of this device, it will be noted, in particular, that the precision of the remote control, on the one hand, and the torque which can be developed by the machine may be adjusted independently to a certain extent, the first one by determining the number of stator armatures and the second one by acting on the number of ampere-turns.

It will be noted, also that the electromagnetic switch, in the present case, plays the part of a frequency divider, producing, from an alternating current at 50 C. P. S., a current, the frequency of which, at the output from the rectifier bridges T may vary from 0 (rotor 35 stopped) to a few C. P. S.

Of course, other devices than an electromagnetic switch of the rotating type may be used (for instance a system of potentiometers with a multi-phase distribution).

Figure 6:
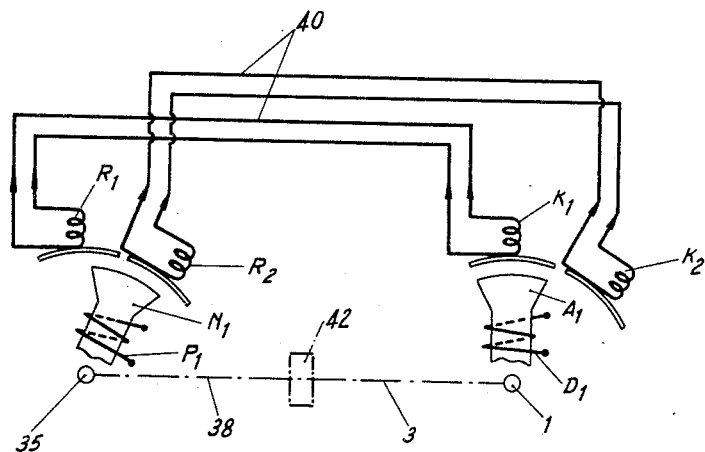
Figure 6 is an explanatory diagram of another embodiment.

In an embodiment allowing the operation of the motor at a high speed with self-starting (Figure 6 and 7) it is intended to energize the stator windings K and L with with alternating current supplied by the stator windings R, owing to conductors 40, while the shafts 3 and 38 of the rotors 1 and 35 are placed co-axially and connected by means of a coupling 42 which is preferably elastic.

For generating a driving torque capable of acting on the rotor 1, and rotating it, the invention provides an angular offset $a$ between the resulting magnetic field attracting the armatures A and the axis thereof. These means may be obtained:

Either (Figure 6) by angularly offsetting the rotors 1 and 35 with respect to one another, the rotor 1 lagging with respect to the rotor 35, the stator armatures being assumed to be in coincidence.

Or by offsetting the corresponding positions of the stator armatures of the machine and of the rotating switch (Figure 7) the latter being, for example, provided with a rack 43 controlled by a worm 44 associated with a crank 45 or equivalent means. The stator 36 of the switch is then mounted on bearing 49 allowing its angular movement. On the contrary the armatures of the rotors 1 and 35 are then supposed to be in angular coincidence.

It will be realized that under these conditions, by adjusting angle $a$, the driving torque is adjusted and consequently the speed. If the sign of $a$ changes, the rotor 1, first is braked, stops and then rotates in the contrary direction.

Due to the elastic coupling, if the driving shaft 3 is subjected to a variable resistant torque, angle $a$ varies accordingly and in the same direction. Consequently, the motor set is self regulating as regards power.

Figure 7:
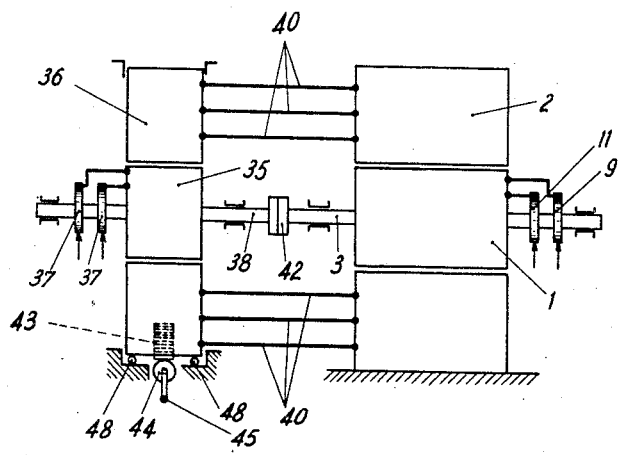
Figure 7 is a diagrammatic view, in elevation, concerning a high speed motor.
Figure 8:
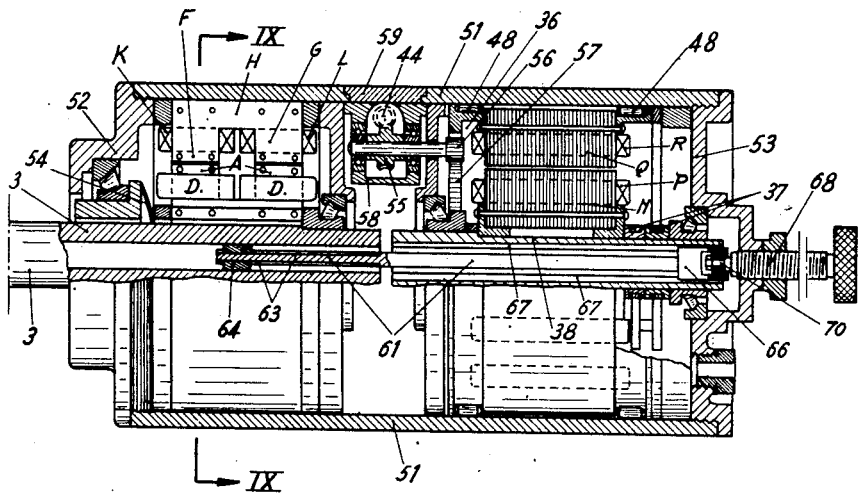
Figure 8 shows, in axial half section the corresponding embodiment.
Figure 9:
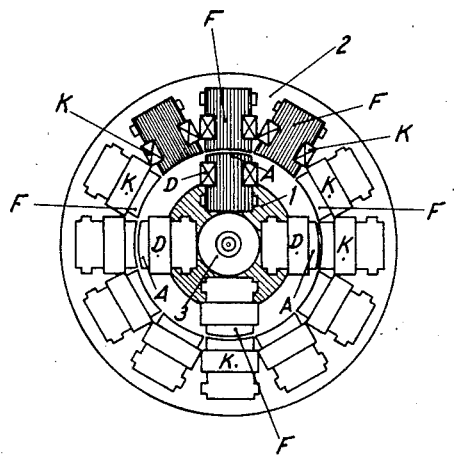
Figure 9 is a half section along IX—IX in Figure 8.

A more detailed embodiment of the invention, substantially conform with Figure 7, is represented in Figures 8 and 9. The switch and motor are here united in a cylindrical carcass 51, closed at its two ends by threaded caps 52, 53 so as to constitute a single block assembly. The play taking-up spring in the motor is constituted by a Belleville washer 54 while the armatures of the rotor and stator are laminated in a longitudinal direction (Figure 9).

On the contrary, the electromagnetic switch is laminated transversely. The angular control of the stator yoke 36 mounted on the rollers 48 is obtained by means of the worm 44 in mesh with the pinion 55 rigidly coupled with the pinion 56 which gears with a toothed crown 57 rigidly coupled with the yoke 36. The pinion 55 is housed inside a housing 58 located between the switch and the motor and accessible owing to a removable cover 59.

The elastic connection between the shafts 3 and 38 is obtained here by means of an axial torsion bar 61 housed in the inner borings of the shafts. On the motor side, the bar offers two longitudinal grooves 63 and may slide inside a fixed part 64 associated with the shaft 3. On the switch side the bar 61 at its other end, is imbedded into a ribbed head 66. The latter may slide without rotating, along the shaft 38, owing to splines 67 which engage the above mentioned ribs.

The control of the position of the head 66 is ensured by a threaded shaft 68 which can screw into the cap 53. The connection between the end of the shaft 68 and the head 66 is obtained through the medium of a ball bearing with a double stop 70. Under these conditions, it will be realized that by rotating the shaft 68 in the suitable direction, the head 66 may be made to move closer to or further away from the motor, which changes the effective length of the bar 61 and makes the connection between the two rotors more or less rigid.

Obviously the invention is not limited to the forms of embodiment described and these may be subjected to any detail modifications.

I claim:

1. A rotary electric machine comprising a motor having a stator and a rotor, each comprising an assembly of regularly spaced armatures of a permeable metal, each armature having a yoke parallel with the axis of said motor and a radial pole piece at each end of said yoke, the pole pieces of said rotor and stator facing each other and constituting two radial crowns, inductive windings arranged around said pole pieces, the windings of said stator constituting several phases, with the windings of the same phase being connected in series, means for energizing the windings of said rotor and creating continuous opposite polarities on said two crowns of the rotor, said machine comprising also a rotating electromagnetic switch having a rotor and a stator, the rotor of said switch comprising pole pieces and inductive windings, means for energizing said windings and creating at the same moment the same polarity on said pole pieces, means for rotating said rotor, the stator of said switch comprising radial pole pieces with inductive windings associated into phases, and means for feeding the windings of each phase of the stator of said motor from the windings of a corresponding phase of the stator of said rotating electromagnetic switch.

2. A rotary electric machine according to claim 1 wherein said means for feeding the windings of each phase of the stator of the motor from the windings of a corresponding phase of the stator of the rotating electromagnetic switch comprise bridges of rectifiers, two terminals of each of said bridges being fed by the windings of the same phase of said switch, two other terminals feeding the windings of the same phase of the stator of said motor, whereby said machine constitutes a positioning set with a low or a null speed.

3. A rotary electric machine comprising a motor having a stator and a rotor, each comprising an assembly of regularly spaced armatures of a permeable metal, each armature having a yoke with the axis of said motor and a radial pole piece at each end of said yoke, the pole pieces of said rotor and stator facing each other and constituting two radial crowns, inductive windings arranged around said pole pieces, said machine comprising also a rotating electromagnetic switch having a rotor and a stator, the rotor of said switch comprising pole pieces and inductive windings, the stator of said switch comprising radial pole pieces and inductive windings, means for feeding each winding of the stator of said motor by a corresponding winding of the stator of said switch, means for mechanically coupling said two rotors in rotation, means for energizing said windings of said two rotors with alternative current, said means creating at each moment opposite polarities on said two crowns of the rotor of said motor, and creating the same polarity on the pole pieces of the rotor of said switch, said machine thus constituting an alternating current motor.

4. A machine according to claim 3 wherein said rotors and stators of said motor and rotating switch are coaxial, said machine comprising also a resilient adjustable coupling between said two rotors, and means to provide an adjustable angular offset between said two stators, said machine thus constituting a self regulating powered motor set with a reversible sense of rotation.

5. A machine according to claim 3 wherein said rotors and stators of said motor and rotating switch are coaxial, said machine comprising also a torsion bar disposed between said two rotors, and means to adjust the length of said torsion bar.

References Cited in the file of this patent

UNITED STATES PATENTS

| 1,524,370 | Seibt et al. | Jan. 27, 1925 |
| 1,934,766 | Krussmann | Nov. 14, 1933 |
| 2,098,002 | Guerin et al. | Nov. 2, 1937 |
| 2,112,852 | Lindell | Apr. 5, 1938 |
| 2,232,097 | Deal et al. | Feb. 18, 1941 |
| 2,267,606 | Goldstine | Dec. 23, 1941 |
| 2,648,786 | Kritter | Aug. 11, 1953 |

FOREIGN PATENTS

| 838,012 | France | Nov. 28, 1938 |